Jan. 23, 1940.                M. P. CARPENTER                2,187,875
                                  FLUID ROTOR
                    Filed April 29, 1937        5 Sheets-Sheet 1
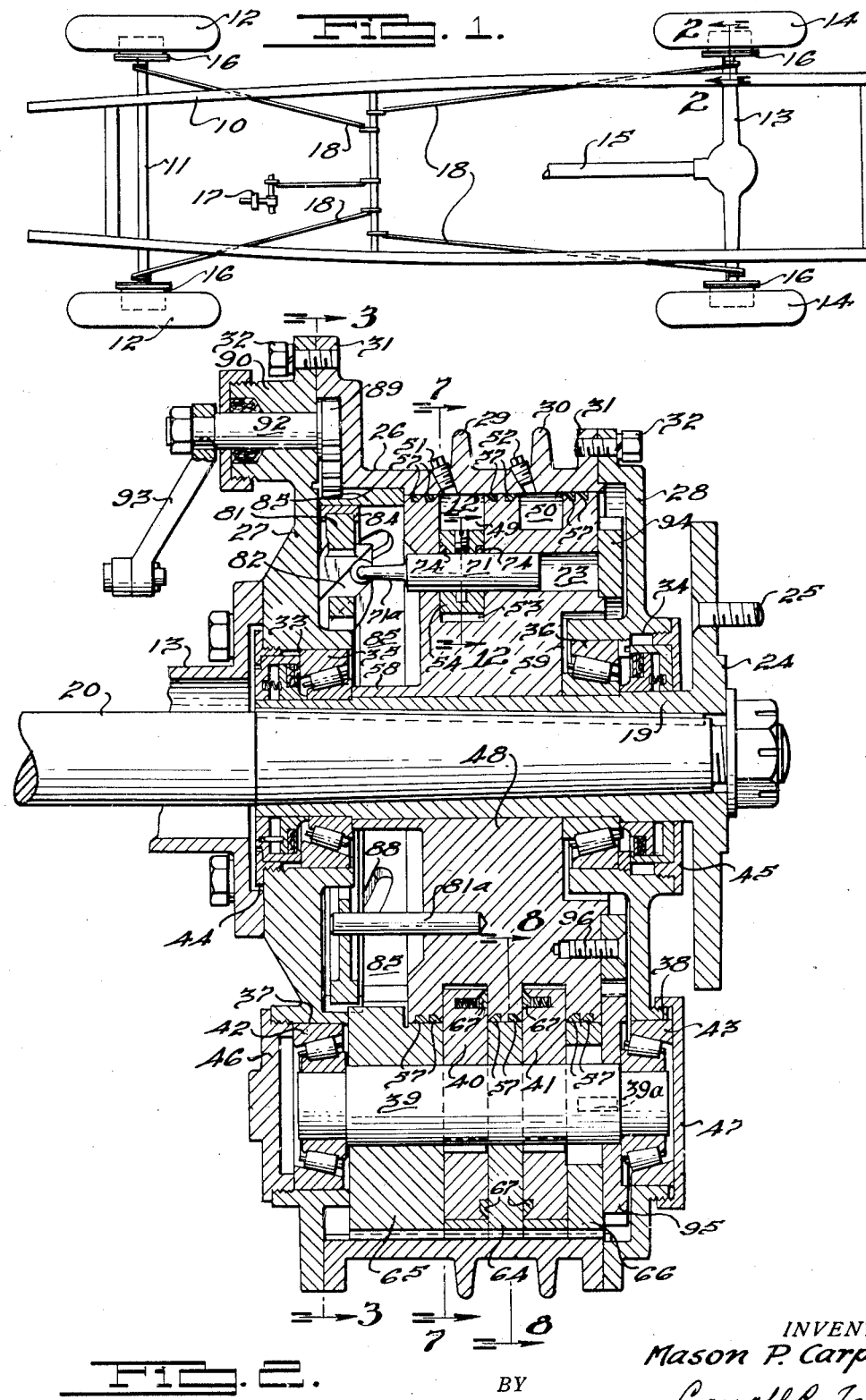
INVENTOR
Mason P. Carpenter.
Carroll R. Taber
ATTORNEY

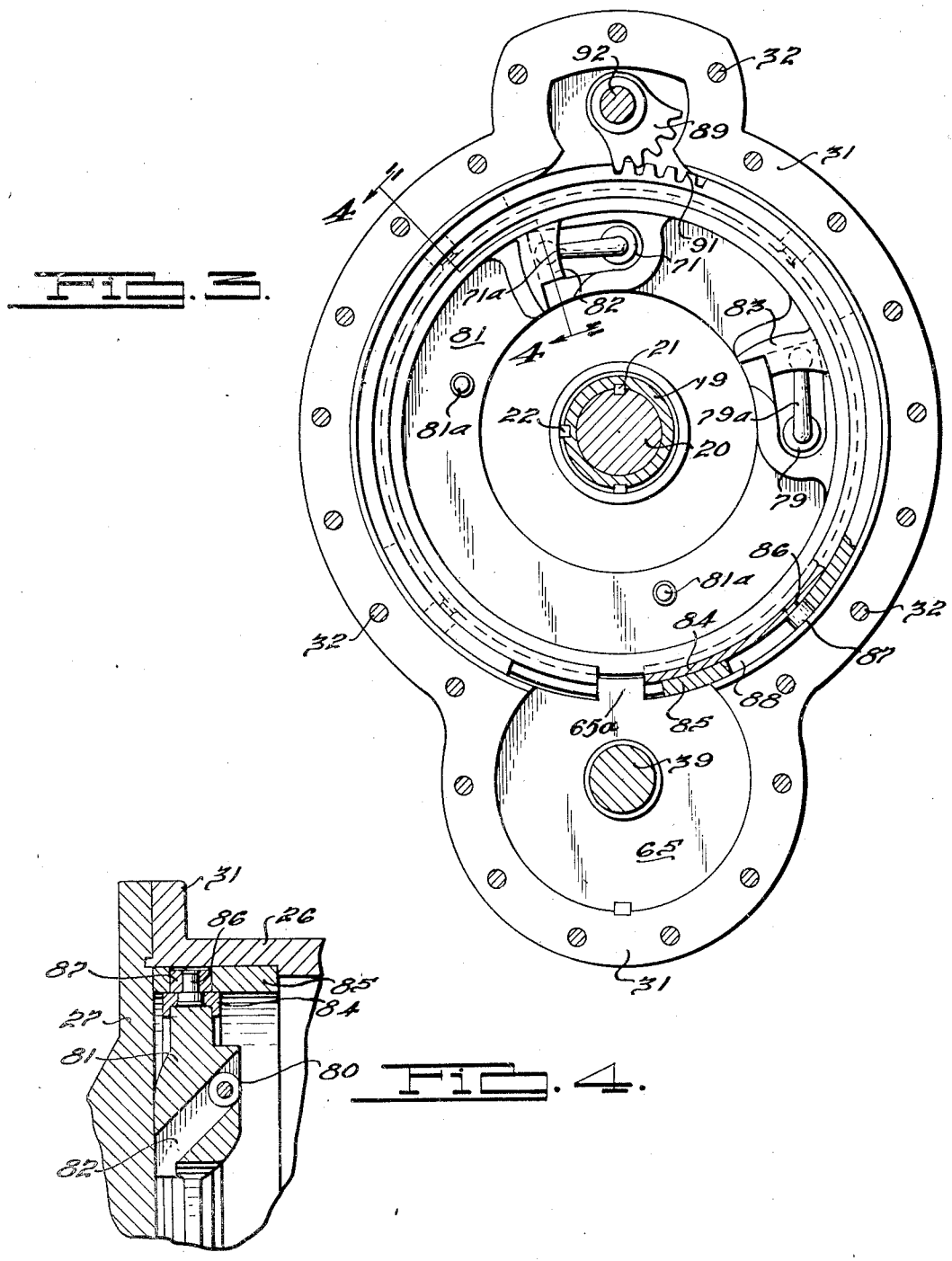

Jan. 23, 1940.　　　M. P. CARPENTER　　　2,187,875
FLUID ROTOR
Filed April 29, 1937　　5 Sheets-Sheet 3

INVENTOR
Mason P. Carpenter.
BY
Carroll R. Taber
ATTORNEY

Jan. 23, 1940.    M. P. CARPENTER    2,187,875
FLUID ROTOR
Filed April 29, 1937    5 Sheets-Sheet 4
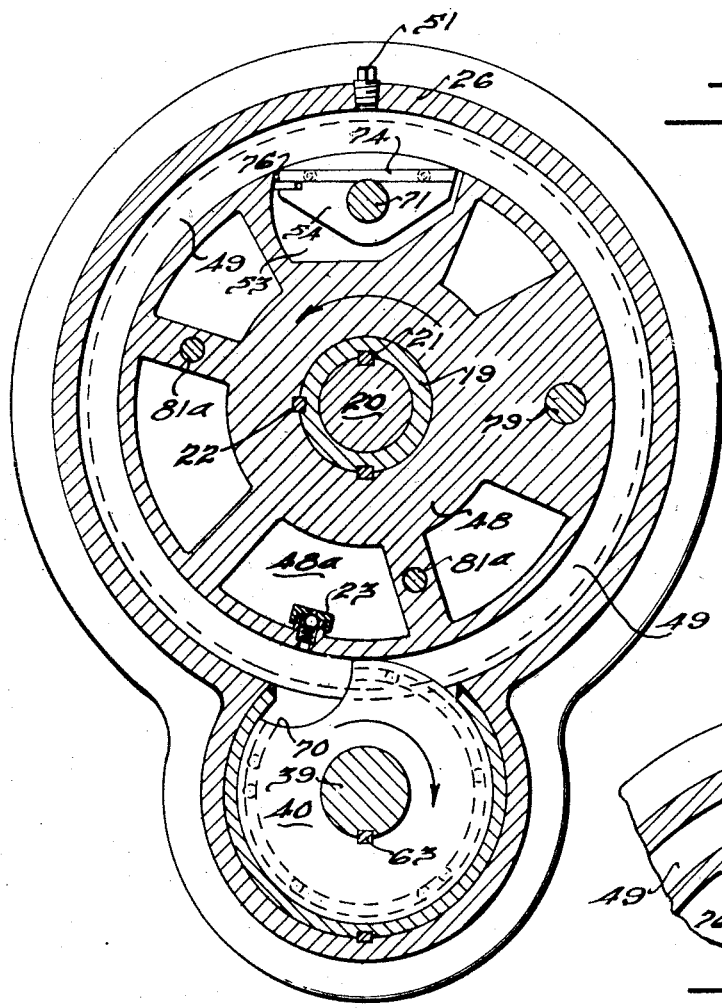
Fig. 7.
Fig. 9.
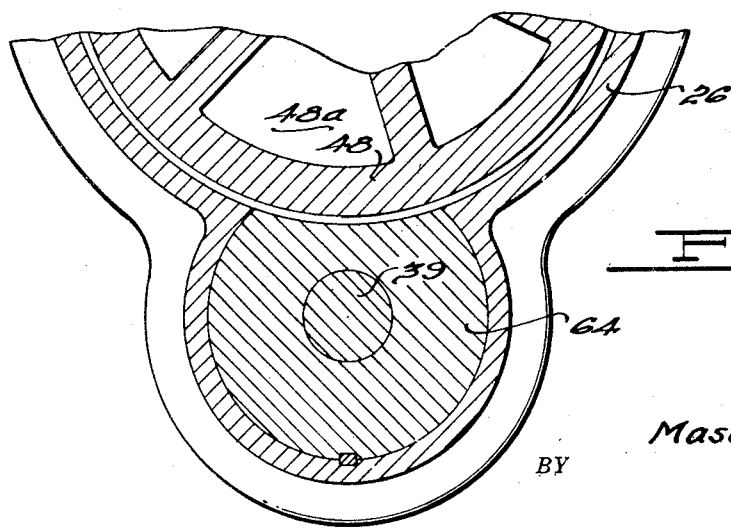
Fig. 8.
INVENTOR
Mason P. Carpenter.
BY Carroll R. Taber
ATTORNEY

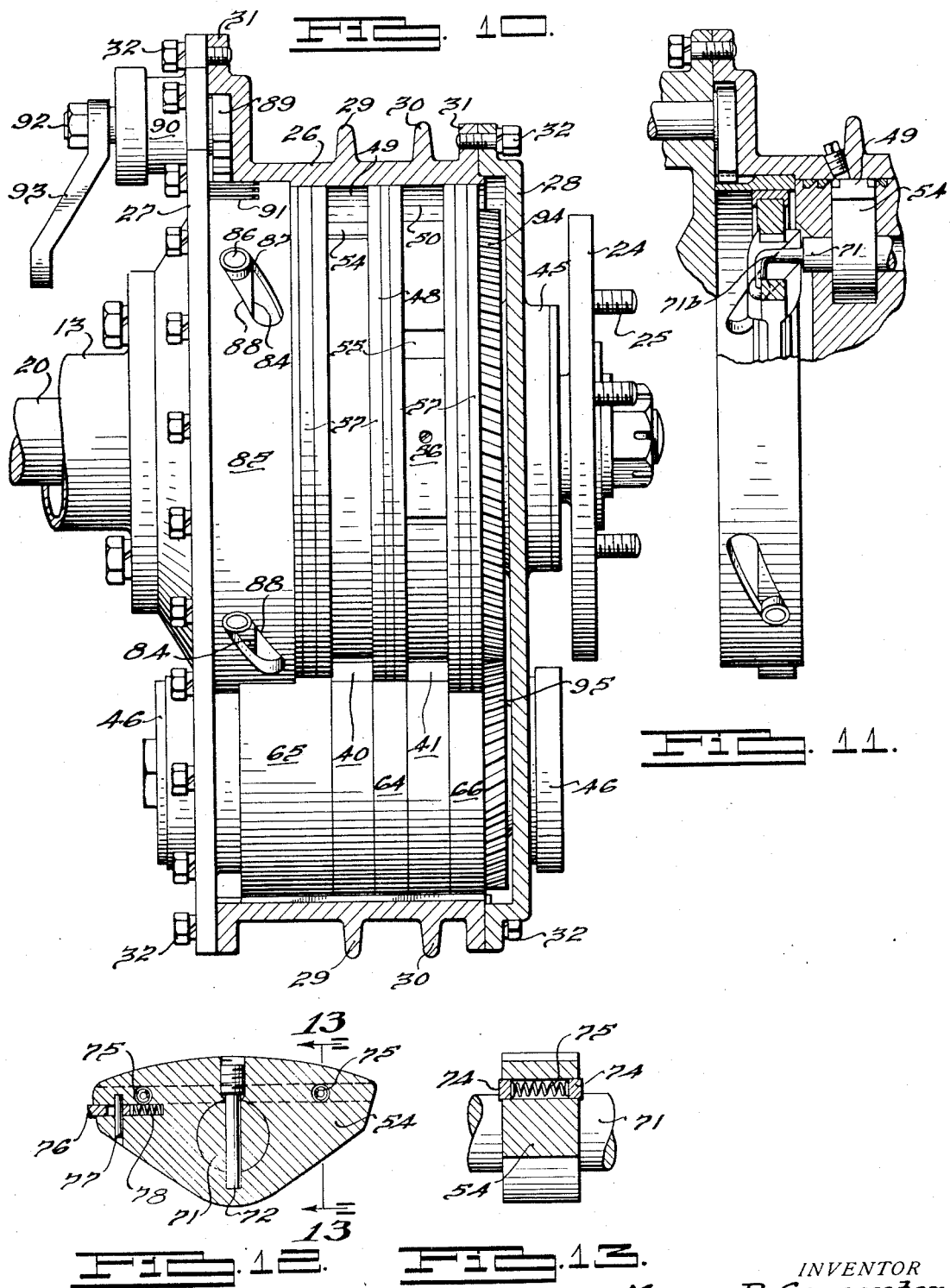

Patented Jan. 23, 1940

2,187,875

UNITED STATES PATENT OFFICE 2,187,875

FLUID ROTOR

Mason P. Carpenter, Punta Gorda, Fla., assignor to International Frictionless Brake Corporation, Lansing, Mich., a corporation of Michigan Application April 29, 1937, Serial No. 139,803

20 Claims. (Cl. 188—90)

This invention relates to fluid rotors of a character wherein power is transmitted through or dissipated by the compression of a fluid contained within the device. The invention is especially applicable to motor vehicle brakes, transmissions, clutches, and the like. For the purpose of illustration it is herein shown as embodied in a brake.

The present invention is disclosed in part in my copending application Serial No. 752,574, filed November 12, 1934, and this application is an improvement on said prior copending application.

Briefly, the invention consists in providing a casing, a rotor mounted within the casing to form a pair of fluid channels with the casing, a pair of auxiliary rotors having their peripheries disposed within the fluid channel in contact with the main rotor, impeller valves carried by the main rotor which are adapted to be moved into and out of each of the fluid channels, and means for actuating the impeller valves. The main rotor is adapted to be secured to a rotatable shaft, and the casing is adapted to be secured to a stationary element. During operation, when the impeller valves are in their inoperative position, the casing and main rotor are freely rotatable relative to each other. When the impeller valves are in their operative position, completely or partially closing off the fluid channels, the fluid is trapped in the fluid channels between the impeller valves and the peripheries of the associated auxiliary rotors whereby the rotary movement of one of these parts with respect to the other may be prevented.

When the present invention is embodied in a brake for a motor vehicle, the main rotor is secured to rotate with the wheel and the casing is rigidly attached to a stationary part of the vehicle, such as the rear axle housing, for example. With this arrangement of parts, the main rotor rotates with the wheel axle until the impeller valves have been moved into their operative position, whereupon the resistance of the fluid trapped in the fluid channels between the impeller valves and the associated auxiliary rotors prevents or slows up, depending upon the position of the impeller valves, the rotation of the main rotor and the axle to which it is keyed with respect to the stationary casing and the housing to which it is secured.

The principal object of the invention is the provision of a novel construction and arrangement of the rotor and associated impeller valves whereby the possibility of inadvertently locking the rotor with respect to the casing is avoided.

Other objects have to do with the provision of valve actuating parts of novel construction and arrangement, and of seal means for preventing the escape of the fluid contained within the fluid channel.

A preferred embodiment of the invention in a brake for motor vehicles is shown in the accompanying drawings, wherein—

Figure 1 is a diagrammatic illustration of a motor vehicle chassis having associated with each of the wheels thereof a brake embodying the present invention and illustrating the mechanism for operating all of said brakes simultaneously;

Figure 2 is a cross-sectional view taken on substantially the line 2—2 of Figure 1, showing the details of a brake embodying the present invention as applied to the rear axle of a motor vehicle;

Figure 3 is a sectional view taken on substantially the line 3—3 of Figure 2;

Figure 4 is a fragmentary sectional view taken on substantially the line 4—4 of Figure 3;

Figure 7 is a sectional view taken on substantially the line 7—7 of Figure 2;

Figure 8 is a view showing the relation of the main rotor to the spacer 64 taken on the line 8—8 of Figure 2;

Figure 9 is an enlarged fragmentary sectional view similar to Figure 7 showing the impeller valve in its operative position as distinguished from the inoperative position shown in Figure 7;

Figure 10 is a side view of the complete brake structure with the casing broken away to show certain of the internal parts thereof;

Figure 11 is an enlarged view partly in section and partly in elevation of the mechanism for actuating the impeller valves;

Figure 12 is an enlarged sectional view of one of the impeller valves taken on the line 12—12 of Figure 2; and Figure 13 is a view taken on substantially the line 13—13 of Figure 12.

Figure 5:
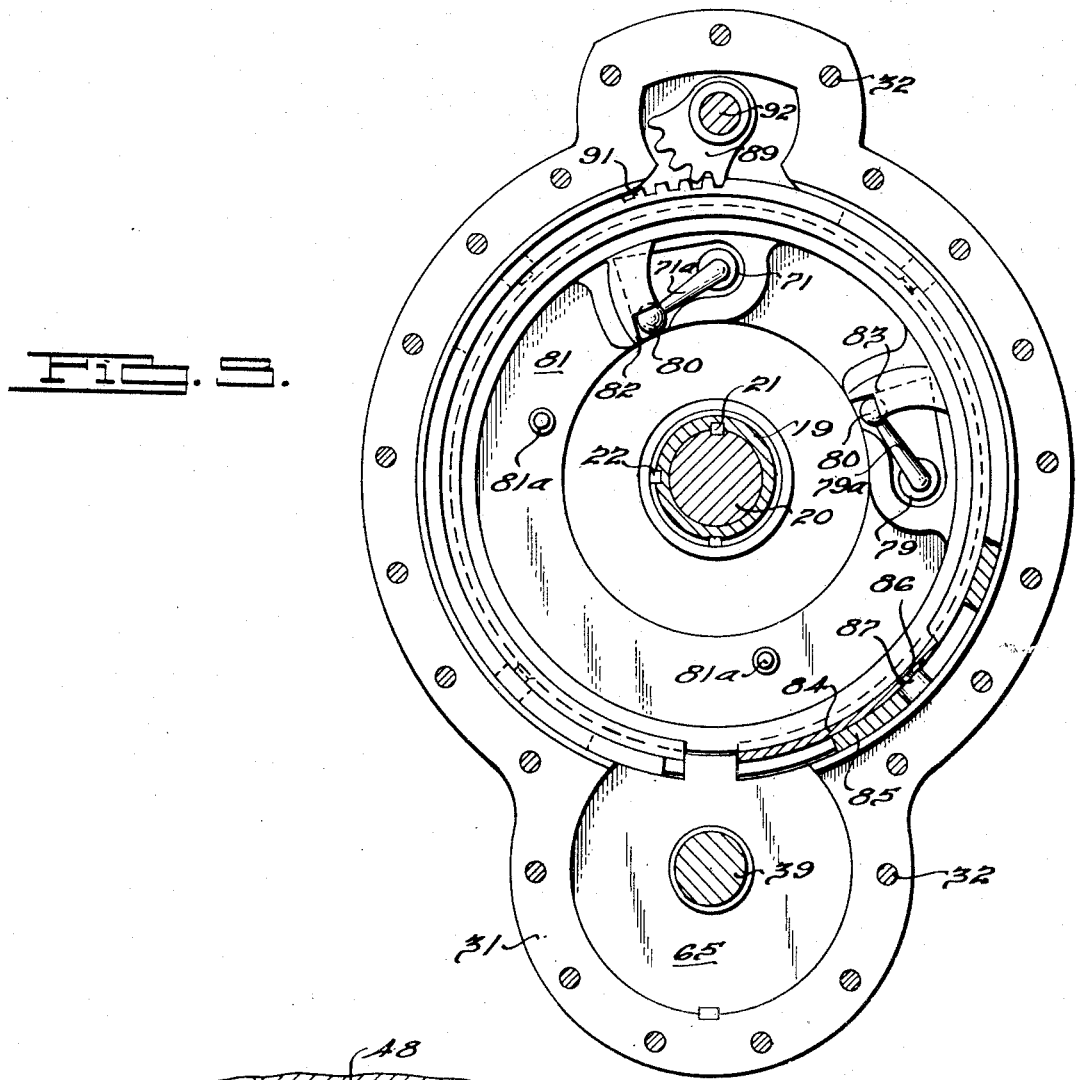
Figure 5 is a view similar to Figure 3, but showing the mechanism in the braking position as distinguished from the non-braking position shown in Figure 3.

While, as stated above, the present invention has application in devices other than brakes, and when applied to brakes is not limited to motor vehicle brakes, it is nevertheless for the purpose of exemplification here shown as embodied in a brake associated with the wheel of a motor vehicle.

In Figure 1 there is shown a motor vehicle chassis including the frame 10, the front axle 11, the front wheels 12, the rear axle housing 13, the rear wheels 14, and the drive shaft 15. A brake 16 is associated with each of the front and rear wheels. The brakes are operated through an operating mechanism including the conventional brake pedal 17 and the mechanical linkages 18.

As best shown in Figures 2 and 7, the rear wheel hub 19 is keyed upon the rear axle 20 by a key 21. The rotor portion of the brake 16 is keyed upon the hub 19 by key 22. The casing forming a part of the brake 16 is bolted to the rear axle housing 13. The wheel hub 19 includes a radial flange 24 to which the wheel 14 is secured by means of conventional securing bolts 25.

The brake 16 consists of several main parts, namely, an outer casing including the cylindrical shell 26, and side members 27 and 28 secured to the opposite edges of the cylinder; a main rotor 48 mounted within the casing to form therewith a pair of axially spaced fluid channels 49 and 50 about the periphery of the rotor; a pair of auxiliary rotors 40 and 41 mounted upon a rotatable shaft 39 and arranged so that their peripheries engage the fluid channels 49 and 50 respectively; a pair of valves 54 and 56 mounted in the main rotor 48 adapted to be moved into and out of the fluid channels 49 and 50; a valve actuating assembly including the valve shafts 71 and 79, the valve actuating ring 81, the shift ring 84, the operating ring 85, the gear segment 89, and the crank arm 93 for the gear segment; and the auxiliary rotor driving means including gears 94 and 95 through which the shaft 39 for auxiliary rotors 40 and 41 is driven from the main rotor 48.

The casing

The casing, as previously stated, includes the cylindrical shell 26 and the end members 27 and 28. The cylindrical shell 26 is provided with the external heat dissipating ribs 29 and 30 and is formed with radially outwardly extending flanges 31 at the edges thereof. The end members 27 and 28 are formed with peripheral flanges corresponding to the flanges 31 and are secured to the cylindrical member by the cap screws 32. The end members 27 and 28 are formed with aligned openings 33 and 34 at the sides thereof for the reception of the wheel hub 19. The openings 33 and 34 are somewhat larger than the hub 19 to provide room for the conventional bearings 35 and 36.

The end members 27 and 28 are provided with a pair of additional aligned openings 37 and 38 in the lower portion thereof to receive the shaft 39 upon which auxiliary rotors 40 and 41 are mounted. These openings are also formed larger than the shaft 39 to accommodate the conventional bearings 42 and 43. All of the openings 33, 34, 37 and 38 are threaded to receive the closure caps 44, 45, 46 and 47.

The main rotor

The main rotor 48 is provided at its periphery with a pair of axially spaced grooves which form with the cylindrical shell 26 of the outer casing a pair of fluid channels 49 and 50. As clearly shown in Figure 2, the casing is provided with openings leading to these fluid channels which are closed by the caps 51 and 52. These openings are to permit the introduction of fluid into the fluid channels 49 and 50.

A recess 53 is provided in rotor 48 at the bottom of the groove forming fluid channel 49 to receive an impeller valve 54, to be described presently. A similar recess 55 is provided in the rotor 48 at the bottom of the groove forming fluid channel 50 also to receive an impeller valve 56. The two recesses 53 and 55 are circumferentially spaced apart a distance equal to one-fourth of the circumference of the rotor 48, for a purpose which will appear presently.

Main rotor 48 is formed with a central opening through which the wheel hub 19 extends. As previously stated, the rotor is secured to the wheel hub by key 22 shown in Figures 5 and 7.

As clearly shown in Figure 2, rotor 48 does not completely occupy the axial space within the casing. As best shown in Figures 7 and 8, rotor 48 is formed with axially extending openings 48a which communicate with the interior of the casing at the sides of the rotor. The openings 48a and the space within the casing, not occupied by the rotors, is partially filled with the same fluid as used in fluid channels 49 and 50. This fluid in the casing serves to lubricate the valve operating mechanism, to be described presently, and other working parts located outside of the channels 49 and 50. Of course, openings 48a do not communicate with channels 49 and 50 except through check valve 23, the function of which will be described later.

Rotor 48 does completely occupy the radial space within the upper part of the casing except for the fluid channels 49 and 50. Adjacent the opposite sides of the rotor, and adjacent the opposite sides of the fluid channels 49 and 50, the rotor is provided with seal rings 57 which are mounted in annular recesses formed in the periphery of the rotor. These sealing elements prevent the escape of the fluid contained in the fluid channels 49 and 50. The rotor is provided about the central opening therein, through which the wheel hub 19 extends, with a hub-like extension 58 at one side thereof which engages a portion of the bearing 35, and with a flat annular surface 59 at the other side thereof which engages a portion of the bearing 36.

The auxiliary rotors

The auxiliary rotors 40 and 41 are, as previously stated, mounted upon shaft 39. They are each secured to the shaft by keys 63. As clearly shown in Figure 2, these auxiliary rotors are keyed upon the shaft in spaced relation to each other and arranged so that the periphery of auxiliary rotor 40 engages the main rotor 48 at the bottom of the peripheral groove therein forming the fluid channel 49, and so that the periphery of auxiliary rotor 41 engages the main rotor 48 at the bottom of the peripheral groove forming the fluid channel 50.

Of course, auxiliary rotors 40 and 41 rotate with shaft 39. Between the rotors there is provided a stationary spacer 64. At the opposite sides of the rotors there are also provided stationary spacers 65 and 66. Thus, auxiliary rotors 40 and 41 are arranged within recesses which they completely fill, except that there is no frictional engagement between the auxiliary rotors and the walls of the recesses which they occupy.

The auxiliary rotors 40 and 41 are provided with seal rings 67 in the sides thereof adjacent their peripheries, of somewhat similar character to the seal rings 57 mounted upon the periphery of the main rotor 48. From an examination of Figure 2, it will be apparent that the seal rings 67 carried by the auxiliary rotors 40 and 41, and the seal ring 57 carried by the main rotor 48 serve to effectively prevent the escape of any fluid from the fluid channels 49 and 50 adjacent the portion thereof occupied by the peripheries of the auxiliary rotors 40 and 41. If by chance, any fluid should escape, provision is made to draw it back into the channels.

For this purpose, the rotor 48 is provided at the bottom of the grooves therein forming channels 49 and 50 with a one way check valve 23 establishing communication between the casing and each of the channels 49 and 50 (see Figure 7). The rotor 48 is formed with axial openings 48a therethrough which are in open communication with the interior of the casing. The check valves 23 permit fluid to flow into channels 49 and 50 from the spaces 48a but prevent fluid from flowing out of the channels to the spaces 48a. When the valve 54 is in its open position, as shown in Figure 9, a suction is created in the channel behind the valve, between the valve and the auxiliary rotor 40. This suction serves to draw back into the channel 49 through valve 23 any fluid which has escaped from the channel. Of course, the same condition exists with respect to channel 50, which is also provided with a valve 23.

As previously stated, the shaft 39 upon which auxiliary rotors 40 and 41 are mounted is supported within bearings 42 and 43 carried in the side members 27 and 28 of the casing.

Figure 6:
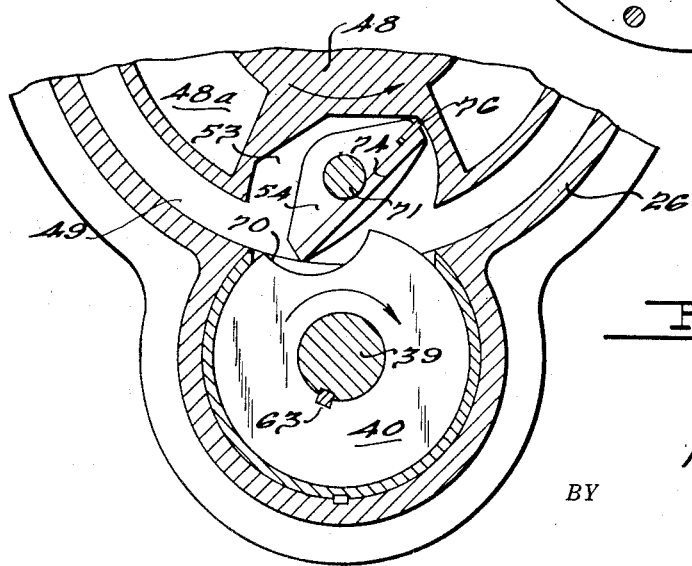
Figure 6 is an enlarged fragmentary sectional view showing the relation of the main and an auxiliary rotor at one stage of operation.

As best shown in Figures 6 and 7, the periphery of each of the auxiliary rotors 40 and 41 is cut away to provide a notch or recess 70. The recess 70 in auxiliary rotor 40 is arranged in circumferentially spaced relation to the corresponding recess in rotor 41. As will be described presently, these recesses provide for the passage, without interference, of the valves 54 and 56 carried by the main rotor 48 and mounted in the fluid channels 49 and 50. The two peripheral recesses 70 in the auxiliary rotors 40 and 41 are spaced 180 degrees apart for a reason which will appear presently.

The valves

The details of construction and arrangement of the valves 54 and 56 which are carried by the main rotor 48 and associated with the fluid channels 49 and 50 are best shown in Figures 6, 7, 9, 12 and 13. The particular shape of the valves is of substantial importance, although the valve need not necessarily be of the exact shape shown. The character of the recesses 53 and 55 and the manner in which the two valves 54 and 56 are mounted in the two recesses are exactly the same, therefore, a detailed description will be given of the construction and mounting of one valve only.

The valve 54 is mounted in the recess 53 upon a shaft 71. It is secured to the shaft, as shown in Figure 12, by a pin 72 countersunk into the top of the valve and extending through the shaft 71. Shaft 71 is mounted in a recess 73 in the rotor 48 and projects out the side of the rotor, as indicated in Figure 2.

The valve 54 is provided at its opposite sides with a pair of sealing elements 74 which are pressed against the sides of the fluid channel 49 when the valve is open and against the sides of recess 53 when the valve is closed by means of the springs 75. At one end the valve is also provided with a somewhat similar sealing element 76 which is secured to the valve by a pin 77 countersunk in the valve 54, and is urged against the walls of recess 53 by a spring 78.

The normal position of valve 54 is shown in Figure 7. Its operative position is shown in Figure 9. The valve may be rotated to any desired position from and including its operative position and its inoperative position by rotating the shaft 71 to which it is secured. When in its operative position, as shown in Figure 9, the valve compresses the fluid contained in the fluid channel 49 between the valve and the point of contact between auxiliary rotor 40 and main rotor 48.

Because valve 54 is of symmetrical formation and its shaft 71 extends through its center of symmetry and mass, the fluid pressure on either side of the valve, regardless of its position, is equally distributed. In other words, the valve is balanced so that the same relatively minute force is adequate to move it to or from its operative position or any intermediate position. In this respect, as in all others, valve 56 is like valve 54.

It will, of course, be understood from the description thus far given, that the recesses 70 in the periphery of the auxiliary rotors 40 and 41 are arranged to permit the passage of the valves 54 and 56 when in their open position, in the manner indicated in Figure 6. It will also be understood that both valves 54 and 56 never pass the auxiliary rotors 40 and 41 at the same time. Thus, there is always maintained a compressing action when the valves are opened, regardless of the fact that one of the valves may at any particular moment be passing one of the auxiliary rotors 40 and 41.

It has already been pointed out that the shaft 71 upon which valve 54 is mounted projects beyond the side of main rotor 48. The shaft 79 upon which valve 56 is mounted also projects out of the same side of the rotor 48 (see Figures 3 and 5). The position of this shaft is shown in section in Figure 7, and it does not appear in Figure 2 because it falls behind the axle 20. Each of the shafts 71 and 79 is provided with radially extending arms 71a and 79a at their outer extremities. Each of the arms 71a and 79a is provided with a rotatable ball 80 for the purpose which will now be described.

The valve actuating assembly

The construction and operation of the valve operating mechanism will best be understood by reference to Figures 2, 3, 4, 5, 10 and 11. This mechanism includes a valve actuating ring 81 positioned within the casing at the left hand side of the main rotor 48 (see Figure 2). The valve actuating ring 81 is movable axially upon pins 81a carried by the main rotor. In other words, the valve actuating ring 81 rotates with the main rotor 48, but is movable axially with respect thereto. As best shown in Figure 4, the valve actuating ring is provided with a pair of channels 82 and 83 inclined to the radial which receive the balls 80 secured to the ends of the arms 71a and 79a of valve shafts 71 and 79. The axial movement of valve actuating ring 81 accordingly imparts a rotary movement to the valve shafts 71 and 79 whereby the valves 54 and 56 are actuated in response to axial movement of the valve actuating ring 81.

A non-rotatable split shift ring 84 surrounds and loosely embraces the outer periphery of the valve actuating ring 81. Shift actuating ring 84 is not connected to valve ring 81 and the valve actuating ring moves circumferentially with respect to the shift ring 84. A split operating ring 85 surrounds the shift ring 84. The shift ring 84 is connected to the operating ring 85 by means of a plurality of pins 86 having one end secured to the shift ring 84 and having its other end provided with a roller 87 which extends into diagonal slots 88 formed in the operating ring 85.

Operating ring 85 is mounted for a limited circumferential movement, but is not movable axially. By reason of the connection between the shift ring 84 and the operating ring 85 through the pins 86 and the diagonal slots 88 just described, it will be understood that the shift ring 84 is moved axially in response to circumferential movement of the operating ring 85. The ends of shift ring 84 are spaced apart and prevented from rotating by the tongue 65a on the spacer 65.

Provision is made for imparting a limited circumferential movement to the operating ring 85 by means of a gear segment 89 mounted within an enlarged portion 90 of the casing. The external surface of the operating ring 85 is provided with cooperating teeth 91 which are engaged by the teeth of gear segment 89.

Gear segment 89 is secured to a rotatable shaft 92 journaled in the boss 90 formed in end portion 27 of the casing. At its outer extremity the shaft 92 is provided with a crank 93 adapted to be connected to the linkage elements 18 of the brake operating system shown in Figure 1.

*Auxiliary rotors driving mechanism*

The shaft 39 to which the auxiliary rotors 40 and 41 are keyed is driven from the main rotor 48 through gear wheels 94 and 95 as best shown in Figures 2 and 10. The gear 94 is secured to the side of the main rotor 48 by the screws 96. The gear 95 is secured to shaft 39 by a key 39a indicated in dotted lines in Figure 2. The gears 94 and 95 are of such size that the auxiliary rotors 40 and 41 make two complete revolutions while the main rotor 48 makes a single revolution.

While this difference in size of the main and auxiliary rotors is preferable in order to economize on space within the casing, it is not essential. The main rotor and the two auxiliary rotors may be of the same size, in which event they will be driven at exactly the same speed.

*The operation*

When the present invention is embodied in a brake its function is, of course, to stop the rotation of the wheel axle. The main rotor 48 rotates with the wheel axle 20 by reason of its connection to the wheel hub 19 which is in turn keyed to the wheel axle. The casing is, of course, stationary, being connected to the non-rotating axle housing 13. Thus, in operation, the casing remains stationary and the rotors rotate when the axle rotates and are stationary when the axle is stationary.

Of course, the fluid channels 49 and 50 are maintained full of any suitable fluid, such as conventional hydraulic brake fluid, or the like. Except when the brake is utilized for braking purposes, the fluid contained in fluid channels 49 and 50 remains substantially stationary and the rotor 48 is rotated in the fluid.

The valve 54 is shown in its non-braking position in Figure 7 and in its braking position in Figure 9. When in its non-braking position the main rotor 48 merely rotates in the fluid. When the valve 54 is in the braking position, shown in Figure 9, then the fluid contained in the fluid channels 49 and 50 is compressed between the valves 54 and 56, and the seals formed by the peripheral engagement of the auxiliary rotors 40 and 41 with the main rotor in the fluid channels 49 and 50. Because of the balanced formation of the valves 54 and 56, it will be readily appreciated that but a slight force is needed to open the valves to the position shown in Figure 9. Likewise, but a slight force is required to move the valves from the operative position shown in Figure 9 to its inoperative position shown in Figure 7, for the same reason.

As previously described, the auxiliary rotors 40 and 41 are provided with peripheral recesses 70 (see Figure 6) to permit the passage of the valves 54 and 56 when in their braking position. In order to avoid complete loss of braking effect when this passage occurs, the valves 54 and 56 and the corresponding recesses 70 in the auxiliary rotors 40 and 41 are staggered so that the two valves never pass the recesses in the auxiliary rotors at the same time. Thus, one of the valves is always producing a braking effect, while the other valve is passing the auxiliary rotor. The two valves are actuated simultaneously.

The valve actuating mechanism is shown in its nonbraking position in Figure 3, at which time the valves 54 and 56 are in the position shown in Figure 7. The valve actuating mechanism is shown in its braking postion in Figure 5, at which time the valves 54 and 56 are in the position shown in Figure 9.

As previously stated, the valves are actuated by the gear segment 89. When the gear segment 89 is rotated by means of the crank arm 93, a limited circumferential movement is imparted to the operating ring 85, which in turn imparts an axial movement to the shift ring 84, which moves the valve actuating ring 81 causing a rotation of the valve shafts 71 and 79. The relation of the arms 71a and 79a at the outer extremities of the valve shafts 71 and 79 during the non-braking position is shown in Figure 4, and the relation of these parts during the braking position is shown in Figure 11.

The action of brake pedal 17 is transmitted to crank 93 through linkage 18. Crank 93 oscillates gear segment 89. Gear 89 imparts a circumferential movement to operating ring 85. The circumferential movement of operating ring 85 is translated into an axial movement of valve ring 81 through the intermediate shift ring 84. Valves 54 and 56 are actuated in response to the axial movement of valve ring 81 through the connections shown at 71, 71a, 80 and 82. Thus, it will be apparent that the impeller valves 54 and 56 are moved into and out of fluid channels 49 and 50 by operating the brake pedal 17.

In the drawings, the direction of rotation of the main rotor 48 and the auxiliary rotors 40 and 41 are shown by arrows (see Figures 6, 7 and 9). It should be understood, however, that the device illustrated works equally well if the direction of rotation of all the rotors is reversed. In other words, valves 54 and 56 work equally well for what might be termed a reverse rotation as well as for what might be termed a forward rotation. This is an inherent characteristic of the balanced valves 54 and 56 and will be readily apparent from an examination of Figures 6, 7, 9, 12 and 13.

From the foregoing description it will be apparent that the present invention provides a novel construction and arrangement of parts, which is especially applicable to brakes of all kinds, and particularly to the brakes for motor vehicles.

The scope of the invention is indicated in the appended claims.

I claim:

1. In a device of the character described, a casing, a main rotor mounted in the casing to form therewith a pair of fluid channels about the periphery of the rotor, a pair of valves pivotally mounted on the main rotor, each of said valves being adapted to be moved into and out of said fluid channels to vary the cross-sectional area thereof, and a pair of auxiliary rotors also mounted in the casing, each of said auxiliary rotors arranged with its periphery contacting the main rotor within a separate one of said channels.

2. The combination defined in claim 1, wherein the main rotor is provided with a recess communicating with each of said fluid channels within which is disposed one of said valves.

3. In a device of the character described, a casing, a main rotor mounted in the casing to form therewith a pair of fluid channels about the periphery of the rotor, a pair of valves pivotally mounted on the main rotor, each of said valves adapted to be moved into and out of a separate one of said fluid channels, a pair of auxiliary rotors also mounted in the casing, each of said auxiliary rotors arranged with its periphery contacting the main rotor within a separate one of said fluid channels, the periphery of each of the auxiliary rotors being cut away to permit the passage of the valve carried by the main rotor in the fluid channel with which said auxiliary rotor is associated.

4. The combination defined in claim 3, wherein the valves carried by the main rotor are spaced circumferentially from each other and the peripheral cutouts in the auxiliary rotors are spaced circumferentially from each other whereby one valve is positioned remote from its corresponding auxiliary rotor when the other valve is passing its corresponding auxiliary rotor.

5. In a device of the character described, a casing, a rotor mounted in the casing to form therewith a fluid channel, a valve carried by the rotor and adapted to be moved into and out of said channel, a valve actuating ring operatively connected to the valve and movable axially with respect to the rotor to actuate the valve, and circumferentially movable means for moving the valve actuating ring axially with respect to the rotor.

6. In a device of the character described, a casing, a rotor mounted in the casing to form therewith a fluid channel, a valve carried by the rotor and adapted to be moved into and out of said channel, a valve actuating ring operatively connected to the valve and movable axially with respect to the rotor to actuate the valve, a non-rotatable shift ring embracing the valve actuating ring, and means for moving the shift ring axially with respect to the rotor.

7. In a device of the character described, a casing, a rotor mounted in the casing to form therewith a fluid channel, a valve carried by the rotor and adapted to be moved into and out of said channel, a valve actuating ring operatively connected to the valve and movable axially with respect to the rotor to actuate the valve, a non-rotatable shift ring embracing the valve actuating ring, a circumferentially movable operating ring secured to the shift ring to effect an axial movement thereof in response to the circumferential movement of the operating ring, and means for imparting a limited circumferential movement to the operating ring.

8. In a device of the character described, a casing, a rotor mounted in the casing to form therewith a fluid channel, a valve carried by the rotor and adapted to be moved into and out of said channel, a valve actuating ring operatively connected to the valve and movable axially with respect to the rotor to actuate the valve, a non-rotatable shift ring embracing the valve actuating ring, a circumferentially movable operating ring secured to the shift ring to effect an axial movement thereof in response to the circumferential movement of the operating ring, and a gear mounted in the casing and arranged to impart a limited circumferential movement to the operating ring.

9. In a device of the character described, a casing, a rotor mounted in the casing to form therewith a fluid channel, said rotor having an annular contact surface forming an axial wall of said channel, and a peripheral portion forming a radial wall of the channel, and a valve pivotally carried by the rotor, said valve being movable into and out of said channel to vary the cross-sectional area thereof.

10. In a device of the character described, a casing, a rotor mounted in the casing to form therewith a pair of axially spaced fluid channels, the rotor being formed to provide adjacent its opposite sides corresponding annular contact surfaces each constituting an axial wall for one of said channels, and having a peripheral portion intermediate said contact surfaces providing at its opposite sides a radially extending wall for each of said channels, and a pair of valves mounted in said rotor in circumferentially spaced relation to each other, said valves being movable into and out of said channels to vary the cross-sectional area thereof.

11. In a device of the character described, a casing, a rotor mounted in the casing and having an annular groove about its periphery forming with the casing a fluid channel, the bottom of said groove being provided with a recess, a valve pivotally mounted in the recess and adapted to be moved into and out of the channel, a valve actuating ring operatively connected to the valve and movable axially with respect to the rotor to actuate the valve, and means for moving the valve actuating ring axially with respect to the rotor.

12. In a device of the character described, the combination defined in claim 11 wherein the valve actuating ring is mounted upon the side of the rotor.

13. In a device of the character described, the combination defined in claim 11 wherein the valve includes an operating lever projecting through the side of the rotor, and wherein the valve actuating ring is mounted upon the side of the rotor.

14. In a device of the character described, a casing, a rotor mounted in the casing to form therewith a fluid channel about the periphery of the rotor, a valve carried by the rotor adapted to be moved into and out of the fluid channel, an axially movable valve actuating ring mounted on the side of the rotor and having an operative connection with said valve, and means for moving the valve actuating ring axially.

15. In a device of the character described, the combination defined in claim 14 wherein the means for moving the valve actuating ring includes a non-rotatable axially movable shift ring embracing the valve actuating ring.

16. In a device of the character described, the combination defined in claim 14 wherein the means for moving the valve actuating ring includes a non-rotatable axially movable shift ring embracing the valve ring and a circumferentially movable operating ring arranged to impart an axial movement to the shift ring.

17. In a device of the character described, the combination with a valve mounted in a rotor and a gear mounted in a casing enclosing the rotor, of a valve actuating unit adapted to be secured to the side of the rotor comprising an axially movable valve actuating ring, a non-rotatable axially movable shift ring embracing the valve actuating ring, and a circumferentially movable operating ring arranged to impart an axial movement to the shift ring, the valve actuating ring having an operative connection with the valve and the operating ring having an operative connection with the gear.

18. In a device of the character described, a casing, a rotor mounted in the casing to form therewith a pair of axially spaced fluid channels about the periphery of the rotor, a pair of valves pivotally mounted on the rotor, each of said valves adapted to be moved into and out of a separate one of said channels, and means located at one side of the rotor for actuating both of said valves.

19. In a device of the character described, a casing, a rotor mounted in the casing to form therewith a fluid channel, the rotor having a recess formed therein communicating with and being of the same width as the channel, a valve pivotally mounted in the recess, one end of the valve being adapted to be swung into and out of the channel, the valve having resilient sealing elements at its opposite sides and at one end for engaging the adjacent walls of the recess and the sides of the channel.

20. In a device of the character described, a casing, a rotor mounted in the casing to form therewith a fluid channel about the periphery of the rotor, the rotor being spaced axially from the sides of the casing and provided with openings extending axially therethrough communicating with the interior of the casing at the sides of the rotor, seals carried by the rotor adjacent the fluid channel to prevent the escape of fluid therefrom, and a one-way check valve arranged between the fluid channel and one of the axial openings in the rotor to permit fluid to flow from the axial opening in the rotor into the fluid channel while preventing the flow of fluid in the reverse direction.

MASON P. CARPENTER.